Aug. 4, 1936.     M. WARE     2,049,678
INTERNAL COMBUSTION ENGINE
Filed April 20, 1934
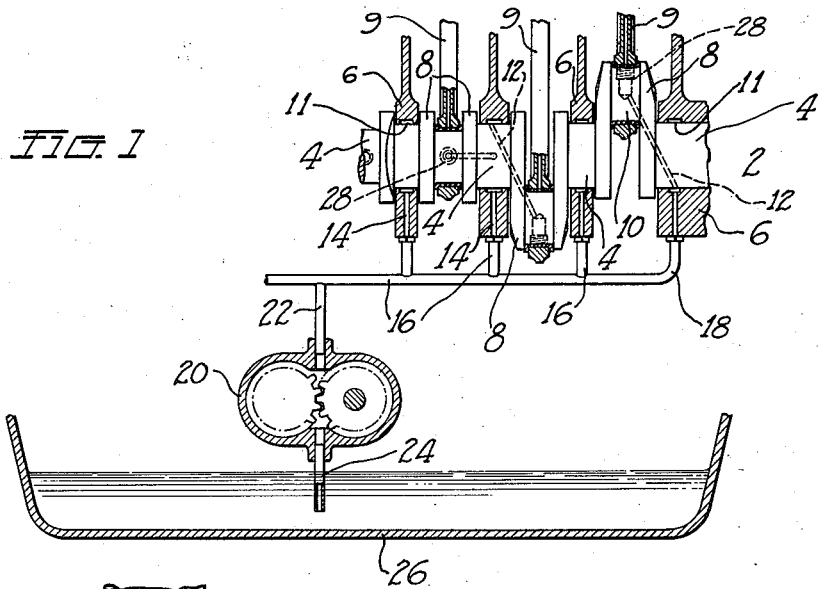
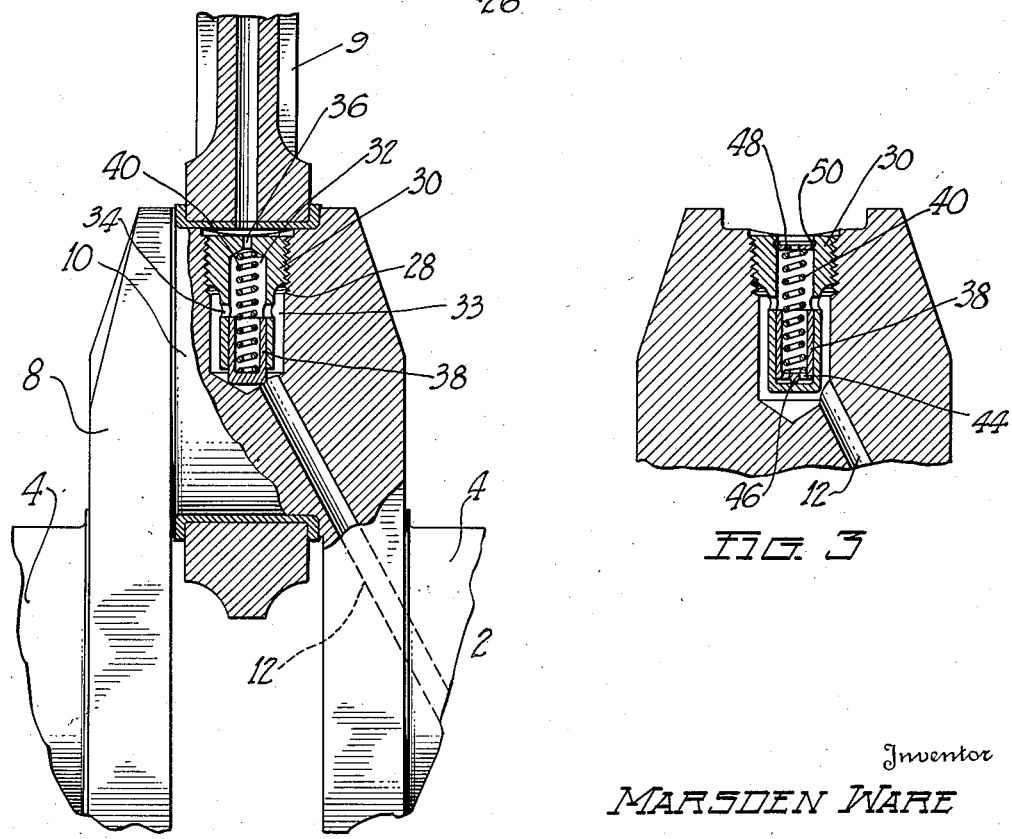
Inventor
MARSDEN WARE
By [signature]
Attorney Patented Aug. 4, 1936

2,049,678

UNITED STATES PATENT OFFICE 2,049,678

INTERNAL COMBUSTION ENGINE

Marsden Ware, Detroit, Mich., assignor to Packard Motor Car Company, Detroit, Mich., a corporation of Michigan Application April 20, 1934, Serial No. 721,429

12 Claims. (Cl. 184—6)

This invention relates to internal combustion engines and more particularly to means for controlling the flow of oil through certain ducts in the rotary parts.

The invention is illustrated in this application as embodied in a mechanism for controlling the flow of oil through a crank pin. The invention is not limited however, in its application to crank pins but certain features thereof may be embodied in or applied to other rotary members.

In the usual internal combustion engine construction the crank shaft is provided with ducts extending through the main bearing portions of the shaft, through the crank arms and through the crank pins through which ducts oil is forced. These ducts extend in directions transverse to the axis of the crank shaft. The action of centrifugal force on the oil in these ducts increases with the speed of the crank shaft and this increases the flow of oil from the crank pins to an extent greatly beyond that required for proper lubrication. The excess of oil flowing from the crank pins comes into contact with the warm walls of the engine and the oil consumption is thereby materially increased.

One object of the present invention is to improve the construction for supplying oil to certain of the rotary members of motor vehicles and to produce a construction which will avoid the disadvantages above pointed out.

Another object of the present invention is to produce a construction which will control the flow of the oil through a duct in a rotary member so that said flow will not be increased under centrifugal action beyond that required for proper lubrication, as the speed of the rotary member is increased.

Another object of the invention is to produce a construction for controlling flow of oil through a duct in a rotary member which will tend progressively to retard the flow of oil through said duct as the pressure of the oil increases under centrifugal action.

With the above and other objects in view, the invention consists in a construction embodying the novel features hereinafter described and particularly pointed out in the claims, the advantages which will be readily understood by those skilled in the art.

The invention will be clearly understood from the accompanying drawing illustrating the invention in its preferred form and the following detailed description of the constructions therein shown.

In the drawing, Fig. 1 is a view in vertical section illustrating certain portions of an internal combustion engine embodying the present invention;

Fig. 2 is a detail view partly in elevation and partly in section illustrating certain of the parts shown in Fig. 1; and—

Fig. 3 is a detail sectional view similar to the sectional portion of Fig. 2 and illustrating a different construction embodying the invention in another form.

In the forms of the invention illustrated in this application the invention is applied to the crank pins of an internal combustion engine. Referring to Fig. 1 of the drawing, the crank shaft on the engine is indicated as a whole at 2 and is provided with bearing portions 4 which engage in the main bearings indicated at 6. The crank shaft is provided with crank arms indicated at 8 carrying crank pins 10 upon which are pivoted the ends of the respective connecting rods 9.

Each of the main bearings 6 is formed with an oil groove 11 and oil ducts 12 are formed in the crank shaft and lead from certain of these grooves respectively through the crank pins. Oil is supplied to the grooves 11 through oil ducts 14 in the main bearings to which are respectively connected pipes 16 all leading from a common supply pipe 18. Oil is delivered to the supply pipe 18 from a pump 20 through a connecting pipe 22. The pump is provided with a pipe 24 arranged to extend downwardly from the body of the pump into the oil in the lower part of the crank case 26.

Each of the crank pins is provided with a construction tending to retard the flow of oil to the crank pin as the speed of the crank shaft increases. One construction embodying the invention is shown in Fig. 2. In the construction shown in this figure an enlarged bore 28 is formed in the crank pin 10, and communicates with the outer end of the duct 12. Within the bore 28 is mounted a valve casing or chamber 30 having a central cylindrical bore 32 and formed with an enlarged outer end which is threaded into the bore 28. The inner portion of the valve casing 30 is considerably less in diameter than the bore 28 as shown clearly in Fig. 2, leaving an annular passage 33 about said casing for the flow of oil and said casing is provided with openings or ports 34 in the wall thereof leading from said passage into the interior of the casing. The casing is provided at its outer end with an opening 36 leading from the interior of the casing to the space between the crank pin and the connecting rod 9 through which the oil flows from the casing.

In order to control the flow of oil from the annular passage 33 through the ports 34 into the casing, a valve 38 is slidably mounted within said casing and is acted upon by coiled spring 40 which tends to maintain the valve in its innermost position in engagement with the inner wall of the bore 28. The dimensions of the valve preferably are such that the outer end of the valve is located adjacent the ports 34 when the valve is in its innermost position and is projected partially across said ports by the movement of the valve outwardly in the casing. It will be noted that the inner end of the valve member 38 is exposed to the full pressure of the oil in the duct 12.

The above construction has the following mode of operation. As the speed of the crank shaft increases, the action of centrifugal force on the oil in the duct 12 and in the annular passage 33 increases considerably the pressure beyond that produced by the pump 20 and this tends to produce a flow of oil to the crank pin in greater quantity than that required for proper lubrication. As the speed of the shaft increases the valve member 38 moves outwardly under centrifugal force and the pressure of the oil thereby carrying the outer end of the valve partially across the ports 34 in the valve casing to a degree depending upon the speed of the shaft. This tends to retard the flow of oil through the ports 34 and to neutralize the effect of the increase in pressure produced in the duct 12 and the passage 33 by centrifugal action.

The construction shown in Fig. 3 of the drawing is similar to that shown in Fig. 2 but differs therefrom in the manner hereinafter set forth. The valve casing 30 is closed at its inner end as shown clearly in this figure. The valve member 38 is formed with openings 44 in the inner end wall thereof to permit the free flow of oil through the valve into the valve casing. The valve is also provided with a projection 46 at its inner end which is arranged to engage the inner end wall of the casing to prevent the openings 44 from being closed by the inward movement of the valve. At its outer end, the casing 30 is provided with a disk 48 engaged by the spring 40 and having a central opening for the passage of oil. This disk is held in place within the casing against the action of the spring by means of a snap ring 50.

In the construction shown in Fig. 3 the valve 38 is not exposed directly to the pressure of oil in the duct 12 and is not materially affected by said pressure. As the crank pin rotates the valve moves outwardly under centrifugal force to close partially the valve openings 34 and retard the flow of oil into the valve casing to a degree depending on the speed of the crank shaft.

In both the above constructions the parts are preferably so designed and the valve controlling spring has the strength required to prevent the complete closing of the ports 34. If desired, however, a positive stop may be provided to limit the closing movement of the valve.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and object of the invention and having specifically described a construction embodying the invention in its preferred form, what is claimed is:

1. A construction for controlling oil flow comprising a rotary member having an oil duct through which the oil flows constantly and in which centrifugal action tends to increase the flow of the oil therethrough and means associated with said member tending to retard the flow of oil through said duct to a degree varying with the speed of said member.

2. A construction for controlling oil flow comprising a rotary member having an oil duct for feeding oil to a point to be lubricated in which the oil pressure is increased by centrifugal action and means associated with said member tending to retard the flow of oil through said duct to a degree increasing with the speed of said member.

3. A construction for controlling oil flow comprising a rotary member having an oil duct in which centrifugal action tends to increase the flow of the oil therethrough and a centrifugally controlled valve for variably retarding the flow of oil through said duct to compensate for said centrifugal action.

4. A construction for controlling oil flow comprising a rotary member having an oil duct for feeding oil to a point to be lubricated in which the oil pressure is increased by centrifugal action, a pump for supplying oil to said duct and means associated with said member tending to retard the flow of oil through said duct to a degree increasing with the speed of said member.

5. A construction for controlling oil flow comprising a rotary member having a bearing, an oil duct extending transversely of the axis of said member and leading to said bearing and means associated with said member tending to retard the flow of oil through said duct to a degree varying with the speed of said member.

6. A construction for controlling oil pressure comprising a crank pin having an oil duct extending in a direction transverse to the axis of rotation through which the oil flows constantly and means tending to retard the flow of oil through said duct and controlled by the speed of said pin.

7. A construction for controlling oil flow comprising a rotary member having an oil duct, a chamber closed at one end mounted on said member and having one or more lateral openings communicating with said duct and a valve seat adjacent said openings and a valve mounted in said chamber for sliding movement along said seat transversely of said openings and controlled by centrifugal action for controlling the passage of oil through said openings.

8. In an internal combustion engine, a crank shaft having a crank pin containing the outer terminal of a radial oil duct through which a constant flow of oil is maintained and centrifugally controlled means for variably restricting the flow of oil from said duct.

9. A construction for controlling oil flow comprising a rotary member having an oil duct through which the oil is fed to a point to be lubricated and centrifugally controlled means tending to retard the flow of oil through said duct to a degree increasing with the speed of said member.

10. A construction for controlling oil flow comprising a rotary member having an oil duct, a chamber through which the oil flows mounted in said member and having one or more passages communicating with said duct, and a constantly open valve slidably mounted in said chamber and controlled by centrifugal action for controlling the flow of oil through said passages.

11. A construction for controlling oil flow comprising a rotary member having an oil duct through which a constant flow of oil is maintained, a chamber through which the oil flows in said member having one or more openings communicating with said duct, and a valve slidably mounted in the chamber and controlled by the pressure of oil in the duct and by centrifugal action for restricting the passage of oil through said openings as the speed of the rotary member increases.

12. A construction for controlling oil flow comprising a rotary member having an oil duct in which centrifugal action tends to increase the pressure under which the oil passes therethrough, and means controlled by the oil pressure for variably retarding the flow of oil through said duct to a degree varying with the speed of said rotary member.

MARSDEN WARE.